Patented Oct. 23, 1923.

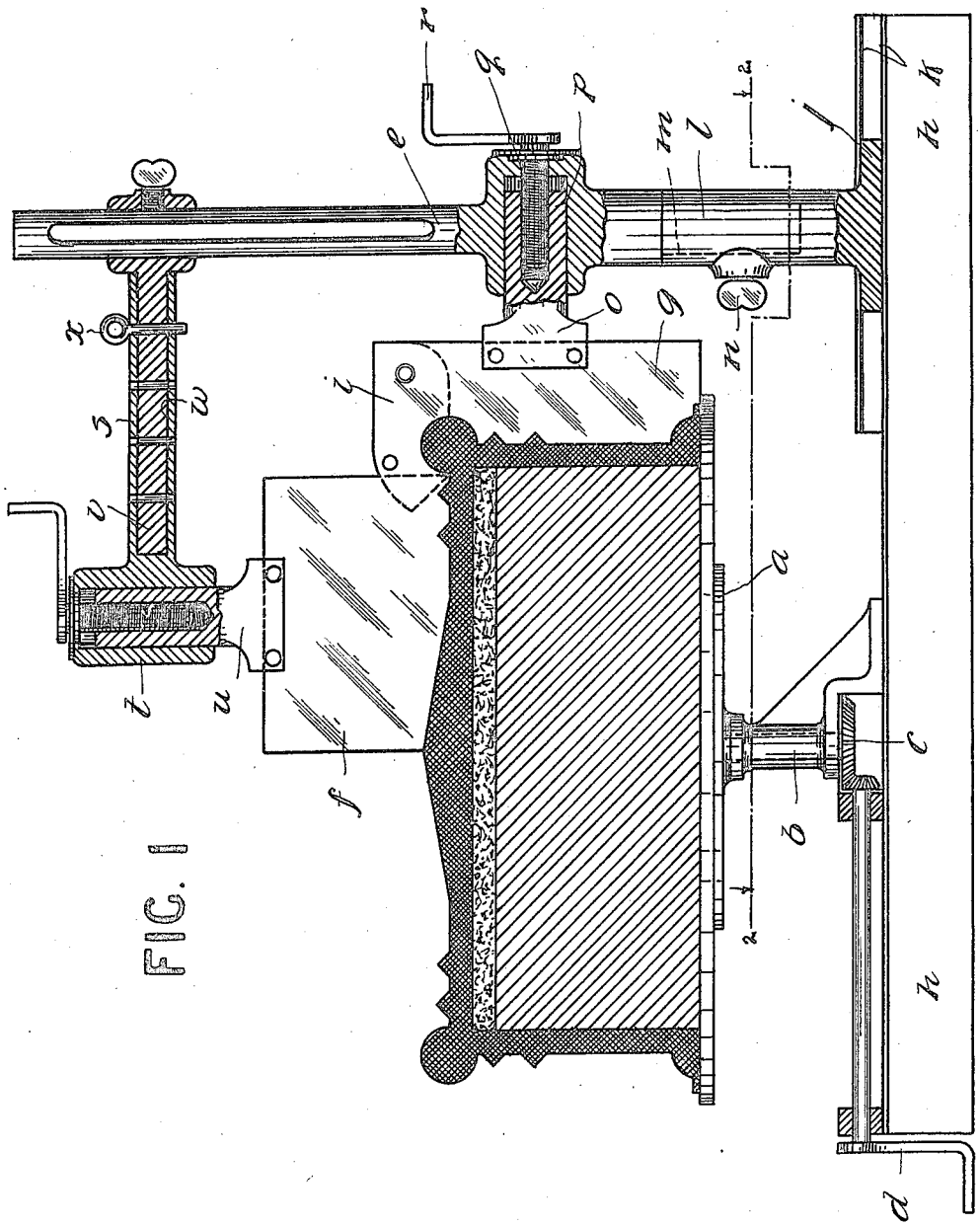

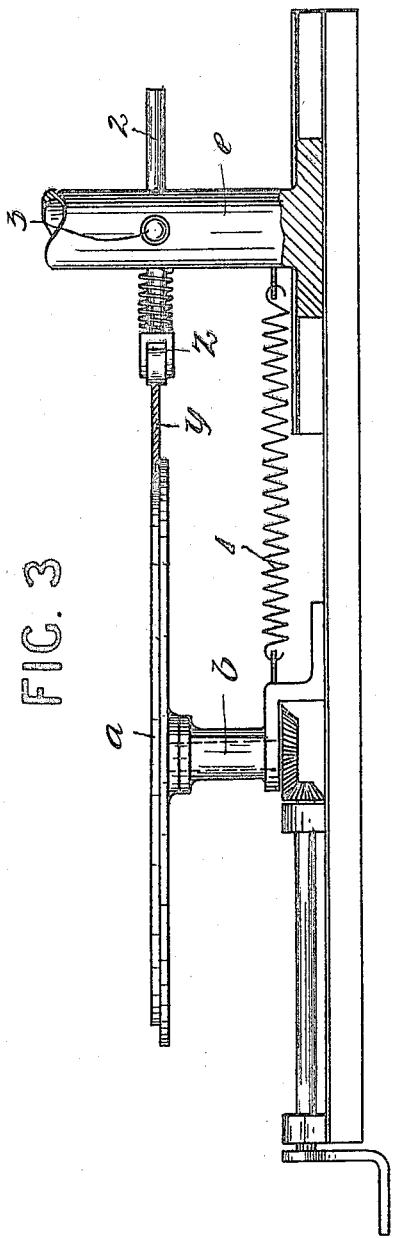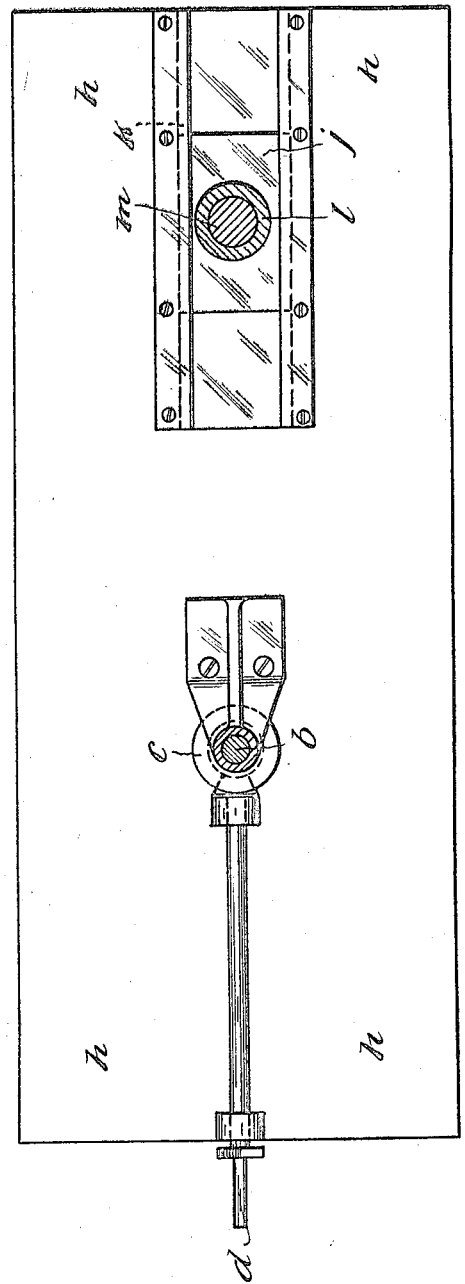

1,472,022

UNITED STATES PATENT OFFICE.

FREDERICK CHARLES COCKBILL, OF KING'S HEATH, BIRMINGHAM, AND JAMES HENRY VICTOR GRIMES, OF MOSELEY, BIRMINGHAM, ENGLAND.

CAKE-ICING DEVICE.

Application filed October 11, 1922. Serial No. 593,814.

*To all whom it may concern:*

Be it known that we, FREDERICK CHARLES COCKBILL, 46 Station Road, King's Heath, Birmingham, England, and JAMES HENRY VICTOR GRIMES, 22 Tudor Road, Moseley, Birmingham, England, both subjects of the King of Great Britain, have invented certain new and useful Improvements in Cake-Icing Devices, of which the following is a specification.

This invention has reference to devices for icing cakes and the like of the type comprising a rotary table upon which the cake is placed and a pair of blades or scrapers adjustably mounted upon an arm or support adapted to be brought against the cake to spread the icing sugar, means being provided for temporarily placing the blades out of contact with the cake or the like.

The object of our invention is to provide an improved device of the type set forth, comprising a slidable standard for the shaping blades pivotally mounted so that it may be swung aside with the blades out of contact with the cake, and sliding supports for each of the blades allowing the blades to be moved gradually towards the cake, one independently of the other.

A feature of the invention consists in mounting the slidable support for the top surface forming blade on an extensible bracket or arm slidably mounted on the standard.

A further feature of the invention is the provision of a bead forming blade for fashioning the joint between the side and the top surface, said blade being hinged to one of the scraper blades and capable of being swung out of the way previous to the withdrawal of the blade from the cake.

As an example of the means which may be employed for this purpose a rotatable table is mounted in suitable relation to rigid, but adjustable and interchangeable blades, supported above, and at the side of, the table, so as to shape and ornament the top and side of the cake.

In the drawings accompanying this specification.

Figure 1 is a side elevation partly in section of a convenient embodiment of construction.

Figure 2, is a sectional plan on line 2—2 of Figure 1.

Figure 3, is a partial elevation of a modification.

In the drawings the rotatable table $a$ is suitably supported on a central spindle $b$, and rotary motion is imparted to it by bevel gearing $c$ actuated in any suitable manner such as by a handle $d$ or the like.

The support for the blades comprises preferably a single standard $e$ upon which the top-surface-forming blade $f$ and a side or edge-forming blade $g$ are mounted.

The standard $e$ is slidably arranged on the bed $h$ supporting the table $a$, such as by mounting the foot $j$ between a pair of rails $k$, so that it may be adjusted for shaping various sizes of cakes, and this standard is preferably revolvable on the slidable foot, by forming the upper part of the foot tubular as at $l$ and the lower extremity of the standard with a spigot $m$ which is free to rotate in the tubular portion $l$, and adapted to be secured by such means as a set pin $n$.

The side blade $g$ is secured or clamped in an adjustable member $o$ adapted to slide in a housing or boss $p$ on the standard, the slide $o$ being adapted to move towards or away from the periphery of the cake by the cooperation of a threaded rod $q$ passing through the slide actuated by a suitable handle $r$. The upper blade $f$ is mounted in a vertically adjustable arm or bracket $s$ adapted to slide, but not to rotate on the upper part of the standard. This bracket $s$ has at its free end a housing or boss $t$ in which is mounted a support $u$ for the said blade adapted to move towards or away from the top surface of the cake by means similar to those employed for the side blade. This arm is extensible by reason of the spigot $v$ sliding in the tubular part $w$, and suitable means such as the pin $x$ shown may be employed to secure the parts in adjusted position.

These adjustable means enable the blades to be moved gradually towards the cake for shaping the top surface and the side.

The side blade $g$ may be advantageously provided with an upper bead-forming blade $i$ adapted to fashion the joint between the side and the top surface. This blade is suitably hinged to the side blade so that previous to the withdrawal of the side blade from the cake this hinged blade may be placed out of the way.

For the fashioning of cakes of irregular shapes, the table $a$ may be formed as a copy member in some such manner as illustrated in Figure 3 wherein the table when rotating is adapted to move the standard $e$ supporting the blades away from the centre of the cake for forming an oval shaped cake for example. For this purpose an interchangeable cam piece $y$ may be secured to the table by screws or the like, and the action of the cam $y$ bearing against the follower $z$ causes the standard to move away from the centre of the cake. In the construction shown at Figure 3, the follower is mounted on an adjustable rod 2 secured in the standard, a screw 3 being provided to secure the rod in any position to which it may be adjusted to suit different designs of cams.

We claim:—

1. In a device for ornamenting iced cakes the combination of a rotatable table, scraper blades mounted upon a standard at one side of the table, slidable supports for the said blades, means for moving the blades independently relatively to the table, a slidable guided support for the said standard, a cam rotating in conjunction with the said rotatable table, and means connecting the said cam with the said standard to cause the standard to move radially towards, and away from, the axis of the rotating table in conformity with the contour of the cam.

2. In a device for ornamenting iced cakes, the combination of a rotatable table, scraper blades, a standard for the blades at one side of the table pivoted to swing the blades away from the table, and a pivoted blade mounted on one of the other blades to swing into and out of scraper position thereon.

3. In a device for ornamenting iced cakes, the combination of a rotatable table, a standard pivoted to swing at one side of the table, scraper blades supported by the standard to engage the top and side of a cake, means for independently adjusting the top and side blades, and a pivoted blade at the top of the side blade to cooperate therewith and independently rotatable thereon.

In testimony whereof we affix our signatures.

FREDERICK CHARLES COCKBILL.
JAMES HENRY VICTOR GRIMES.